United States Patent
Lee et al.

(10) Patent No.: US 9,083,490 B2
(45) Date of Patent: *Jul. 14, 2015

(54) APPARATUS AND METHOD FOR MITIGATING INTER-CELL INTERFERENCE IN MULTIPLE ANTENNA SYSTEM

(71) Applicant: Samsung Electronics Co., Ltd., Suwon-si, Gyeonggi-do (KR)

(72) Inventors: Sang-Woo Lee, Seoul (KR); Hee-Won Kang, Seongnam-si (KR); Shuangfeng Han, Suwon-si (KR); David Mazzarese, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,220

(22) Filed: Jan. 7, 2014

(65) Prior Publication Data

US 2014/0120937 A1    May 1, 2014

Related U.S. Application Data

(63) Continuation of application No. 13/045,922, filed on Mar. 11, 2011, now Pat. No. 8,626,070.

(30) Foreign Application Priority Data

Mar. 12, 2010  (KR) .................. 10-2010-0022186

(51) Int. Cl.
*H04M 1/00* (2006.01)
*H04L 5/00* (2006.01)
*H04B 7/02* (2006.01)
*H04W 72/04* (2009.01)
*H04W 24/02* (2009.01)
*H04W 72/08* (2009.01)
*H04B 7/04* (2006.01)
*H04B 7/06* (2006.01)

(52) U.S. Cl.
CPC .............. *H04L 5/0032* (2013.01); *H04B 7/024* (2013.01); *H04B 7/0456* (2013.01); *H04W 24/02* (2013.01); *H04W 72/0406* (2013.01); *H04W 72/082* (2013.01); *H04B 7/0417* (2013.01); *H04B 7/0639* (2013.01)

(58) Field of Classification Search
USPC ............. 455/63.1, 444, 450, 501, 522, 550.1; 370/329, 332; 375/267
See application file for complete search history.

(56) References Cited

U.S. PATENT DOCUMENTS

| | | | |
|---|---|---|---|
| 7,738,922 B2 * | 6/2010 | Hashimoto et al. | 455/560 |
| 7,962,091 B2 | 6/2011 | Oyman et al. | |
| 8,401,480 B2 * | 3/2013 | Koo et al. | 455/63.1 |
| 2008/0130582 A1 | 6/2008 | Lee et al. | |
| 2010/0273514 A1 | 10/2010 | Koo et al. | |

FOREIGN PATENT DOCUMENTS

| | | |
|---|---|---|
| KR | 10-2008-0074419 A | 8/2008 |
| KR | 10-2010-0005575 A | 1/2010 |

* cited by examiner

*Primary Examiner* — Tuan H Nguyen
(74) *Attorney, Agent, or Firm* — Jefferson IP Law, LLP

(57) ABSTRACT

A method for operating a Base Station (BS) in a wireless communication system is provided. The method comprises of receiving at least one request set for at least one neighboring cell, from at least one Mobile Station (MS), updating the at least one request set based at least in part on a serving band of each MS, and transmitting the updated at least one request set to the at least one neighboring cell, wherein the request set comprises a band and a Precoding Matrix Index (PMI) for making a use restriction or recommendation request to a neighboring cell.

26 Claims, 9 Drawing Sheets

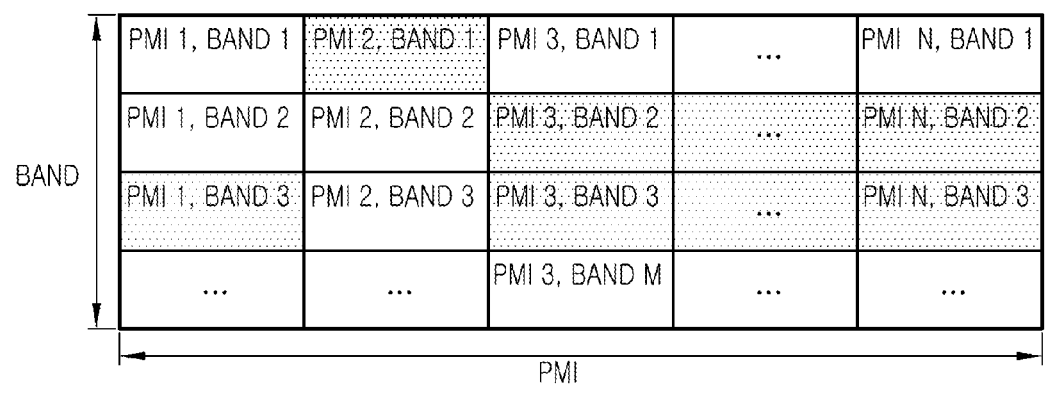

| PMI 1, BAND 1 | PMI 2, BAND 1 | PMI 3, BAND 1 | ... | PMI N, BAND 1 |
|---|---|---|---|---|
| PMI 1, BAND 2 | PMI 2, BAND 2 | PMI 3, BAND 2 | ... | PMI N, BAND 2 |
| PMI 1, BAND 3 | PMI 2, BAND 3 | PMI 3, BAND 3 | ... | PMI N, BAND 3 |
| ... | ... | PMI 3, BAND M | ... | ... |

FIG.7

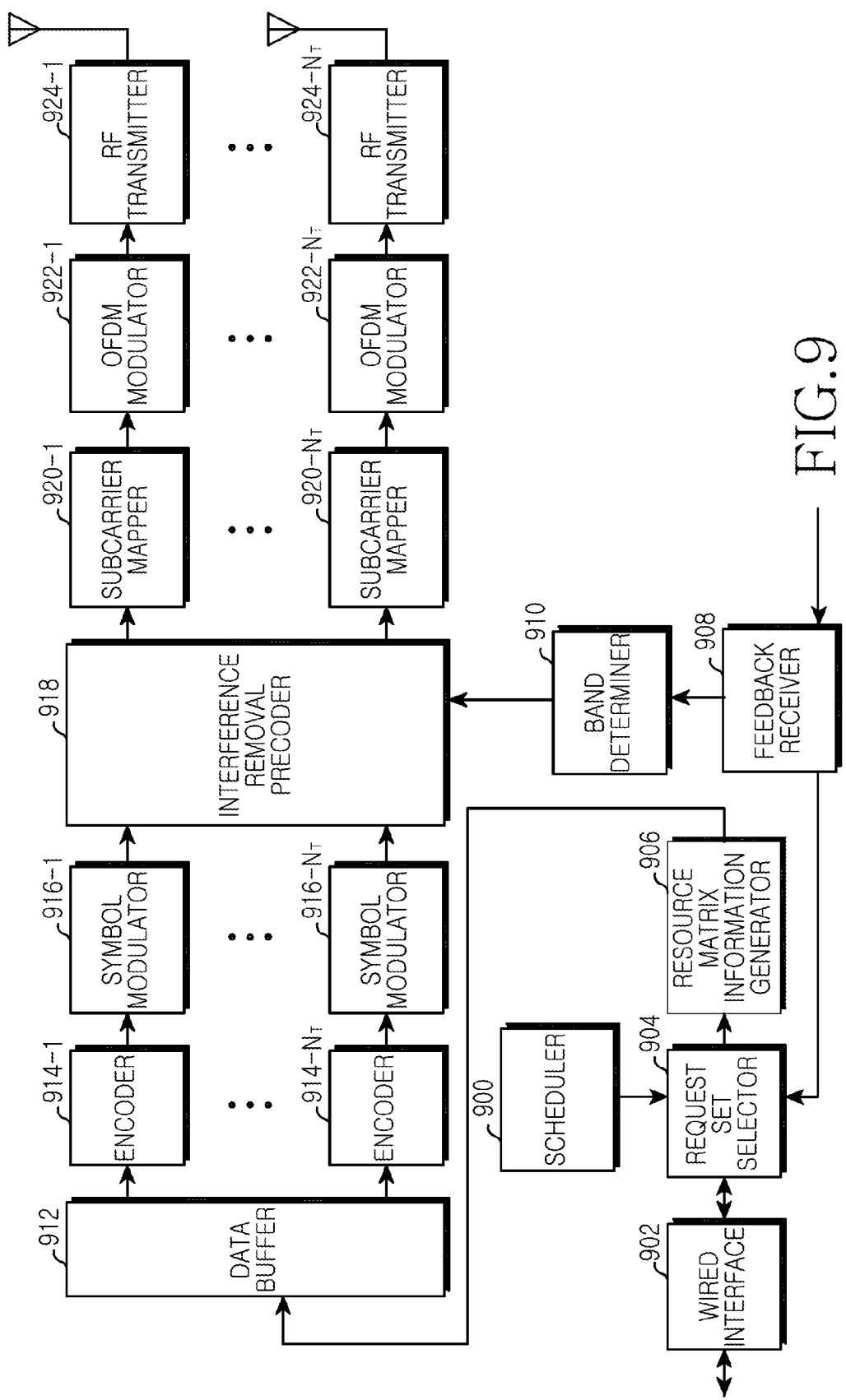

APPARATUS AND METHOD FOR MITIGATING INTER-CELL INTERFERENCE IN MULTIPLE ANTENNA SYSTEM

PRIORITY

This application is a continuation application of U.S. patent application Ser. No. 13/045,922, filed on Mar. 11, 2011 in the U.S. Patent and Trademark Office, which claims the benefit under 35 U.S.C. §119(a) of a Korean patent application filed on Mar. 12, 2010 in the Korean Intellectual Property Office and assigned Serial No. 10-2010-0022186, the entire disclosure of which is hereby incorporated by reference.

BACKGROUND OF THE INVENTION

1. Field of the Invention

The present invention relates to a multiple antenna (i.e., Multiple Input Multiple Output (MIMO)) system. More particularly, the present invention relates to an apparatus and method for mitigating inter-cell interference in the MIMO system.

2. Description of the Related Art

Multiple Input Multiple Output (MIMO) systems divide a transmit beam pattern forming scheme into a closed loop scheme and an open loop scheme.

The closed loop scheme is a scheme in which a Base Station (BS) transmits a signal in a transmission pattern determined considering downlink channel information provided from a Mobile Station (MS). The open loop scheme is a scheme in which a BS transmits a signal in a fixed beam pattern irrespective of a channel state with an MS. For example, the closed loop scheme includes a codebook based communication scheme.

In the case of the codebook based communication scheme, an MS selects a code vector or code matrix suitable to a channel with a serving BS, from a previously arranged and defined codebook, and transmits the selected code vector or code matrix to the serving BS. The serving BS transmits a signal using the code vector or code matrix provided from the MS. That is, the serving BS can transmit a signal using the code vector or code matrix suitable to the channel with the MS, thus maximizing a throughput.

In the case of using the codebook based communication scheme, a BS determines a transmission pattern considering only a channel with an MS. That is, because the BS considers no inter-cell interference, performance may be deteriorated due to neighboring cell interference.

Accordingly, a technology for controlling inter-cell interference in a wireless communication system has been proposed. For example, to control the inter-cell interference, the 3$^{rd}$ Generation Partnership Project (3GPP) Long Term Evolution (LTE) standard proposes a Coordinated Multiple Point Transmission/Reception (CoMP) technology. For another example, to control the inter-cell interference, the Institute Electrical and Electronics Engineers (IEEE) 802.16 standard proposes a Multi-BS MIMO technology.

The CoMP technology is divided into a Coordinated Beamforming (CB) scheme and a Joint Processing/transmission (JP) scheme. Here, the CB scheme represents a scheme in which one BS transmits traffic data for one MS, and control traffic is shared between neighboring cells. The JP scheme is a scheme in which at least two BSs transmit traffic data for one MS. For example, the CB scheme includes a Precoding Matrix Index (PMI) coordination scheme.

In the case of using the PMI coordination scheme, an MS feeds the worst PMI of great interference from a neighboring BS or the best PMI of less interference, back to a serving BS. Based on the feedback information of the MS, the serving BS makes PMI coordination requests to the neighboring BSs that exert interference on the MS. Based on information provided from the serving BS, the neighboring BS restricts the use of the worst PMI (i.e., performs PMI restriction) or recommends the use of the best PMI (i.e., performs PMI recommendation), thus being capable of mitigating inter-cell interference.

However, the PMI coordination scheme has several inherent problems.

Firstly, in the case of MSs feeding information back to a serving BS or communicating between BSs, the PMI coordination scheme uses a restricted bandwidth. Accordingly, because the PMI coordination scheme cannot perfectly remove all PMIs on all subbands giving interference, it is difficult to achieve ideal throughput owing to residual interference.

Secondly, in a case where cell boundary MSs send too many PMI coordination requests to interfering BSs so as to increase their own throughputs, there is a problem that the interfering BSs making the PMI coordination requests from the MSs suffer a shortage of bands and PMIs to provide service to their own MSs.

Lastly, in a case where cell boundary MSs send too few PMI coordination requests, there is a problem of increasing a probability that an interfering cell uses a band and PMI exerting interference on the MS that has sent the PMI coordination request.

Accordingly, there is a need for a way to efficiently reduce inter-cell interference while reducing a collision between cells.

SUMMARY OF THE INVENTION

An aspect of the present invention is to address at least the above-mentioned problems and/or disadvantages and to provide at least the advantages below. Accordingly, one aspect of the present invention is to provide an apparatus and method for mitigating inter-cell interference in a Multiple Input Multiple Output (MIMO) system.

Another aspect of the present invention is to provide an apparatus and method for selecting a Precoding Matrix Index (PMI) such that inter-cell interference is minimized in a MIMO system.

A further aspect of the present invention is to provide an apparatus and method for reducing a feedback overhead for PMI selection in a MIMO system.

Yet another aspect of the present invention is to provide an apparatus and method for determining interference of a PMI for at least one band not included in a use restriction request from a neighboring cell, in a Mobile Station (MS) of a MIMO system.

Still another aspect of the present invention is to provide an apparatus and method for, according to scheduling information, updating a request set provided from an MS, and transmitting the request set to a neighboring cell in a Base Station (BS) of a MIMO system.

The above aspects are addressed by providing an apparatus and method for mitigating inter-cell interference in a MIMO system.

In accordance with an aspect of the present invention, a method for mitigating inter-cell interference in a BS of a MIMO system is provided. The method includes allocating a serving band for providing service to at least one MS through scheduling, receiving at least one request set for at least one neighboring cell, from at least one MS, updating the at least one request set considering a serving band of each MS, and transmitting the updated at least one request set to the at least one neighboring cell. The request set includes at least one piece of information among a band and PMI for making a use restriction request to a neighboring cell that exerts interference on an MS.

In accordance with another aspect of the present invention, an apparatus for mitigating inter-cell interference in a BS of a MIMO system is provided. The apparatus includes a scheduler, a feedback receiver, a request set selector, and a wired interface. The scheduler allocates a serving band for providing service to at least one MS, through scheduling. The feedback receiver receives at least one request set for at least one neighboring cell, from at least one MS. The request set selector updates the at least one request set considering a serving band of each MS. The wired interface transmits the updated at least one request set to the at least one neighboring cell. The request set includes at least one piece of information among a band and PMI for making a use restriction request to a neighboring cell that exerts interference on an MS.

In accordance with a further aspect of the present invention, a method for mitigating inter-cell interference in a BS of a MIMO system is provided. The method includes allocating a serving band for providing service to at least one MS through scheduling, receiving at least one request set for each of at least one neighboring cell, from at least one MS, and transmitting serving band information of each MS and at least one request set to the at least one neighboring cell. The request set includes PMI information for making a use restriction request to a neighboring cell that exerts interference on an MS.

In accordance with yet another aspect of the present invention, an apparatus for mitigating inter-cell interference in a BS of a MIMO system is provided. The apparatus includes a scheduler, a feedback receiver, and a wired interface. The scheduler allocates a serving band for providing service to at least one MS, through scheduling. The feedback receiver receives at least one request set for each of at least one neighboring cell, from at least one MS. The wired interface transmits serving band information of each MS and at least one request set to the at least one neighboring cell. The request set includes PMI information for making a use restriction request to a neighboring cell that exerts interference on an MS.

In accordance with still another aspect of the present invention, a method for mitigating inter-cell interference in a MS of a MIMO system is provided. The method includes determining at least one band not included in a use restriction request from a neighboring cell, determining interference of at least one PMI included in each of the at least one band, determining at least one of a band and PMI to make a use restriction request to a neighboring cell in consideration of the interference of the at least one PMI, and feeding at least one of the band and PMI to make the use restriction request to the neighboring cell, back to a serving BS.

In accordance with another aspect of the present invention, an apparatus for mitigating inter-cell interference in an MS of a MIMO system is provided. The apparatus includes a resource matrix information determiner, a channel determiner, a request set determiner, and a feedback transmitter. The resource matrix information determiner determines at least one band not included in a use restriction request from a neighboring cell. The channel determiner determines interference of at least one PMI included in each of the at least one band. The request set determiner determines at least one of a band and PMI to make a use restriction request to a neighboring cell in consideration of the interference of the at least one PMI. The feedback transmitter feeds at least one of the band and PMI to make the use restriction request to the neighboring cell, back to a serving BS.

In accordance with another aspect of the present invention, a method for mitigating inter-cell interference in a BS of a MIMO system is provided. The method includes selecting at least one request set among at least one request set received from at least one neighboring cell, updating a resource matrix in consideration of the selected request set, and transmitting the updated resource matrix information to at least one MS. The request set includes band and PMI information making a use restriction request from a neighboring cell.

In accordance with another aspect of the present invention, an apparatus for mitigating inter-cell interference in a BS of a MIMO system is provided. The apparatus includes a wired interface, a request set selector, a resource matrix information generator, and a transmitter. The wired interface receives at least one request set from at least one neighboring cell. The request set selector selects at least one request set among the at least one request set received through the wired interface. The resource matrix information generator updates a resource matrix in consideration of the selected request set. The transmitter for transmitting the updated resource matrix information to at least one MS. The request set includes band and PMI information making a use restriction request from a neighboring cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which:

FIG. 7 is a diagram illustrating a resource matrix construction in a MIMO system according to an exemplary embodiment of the present invention;

FIG. 9 is a block diagram illustrating a construction of a BS in a MIMO system according to an exemplary embodiment of the present invention.

Throughout the drawings, like reference numerals will be understood to refer to like parts, components and structures.

DETAILED DESCRIPTION OF EXEMPLARY EMBODIMENTS

Figure 1:
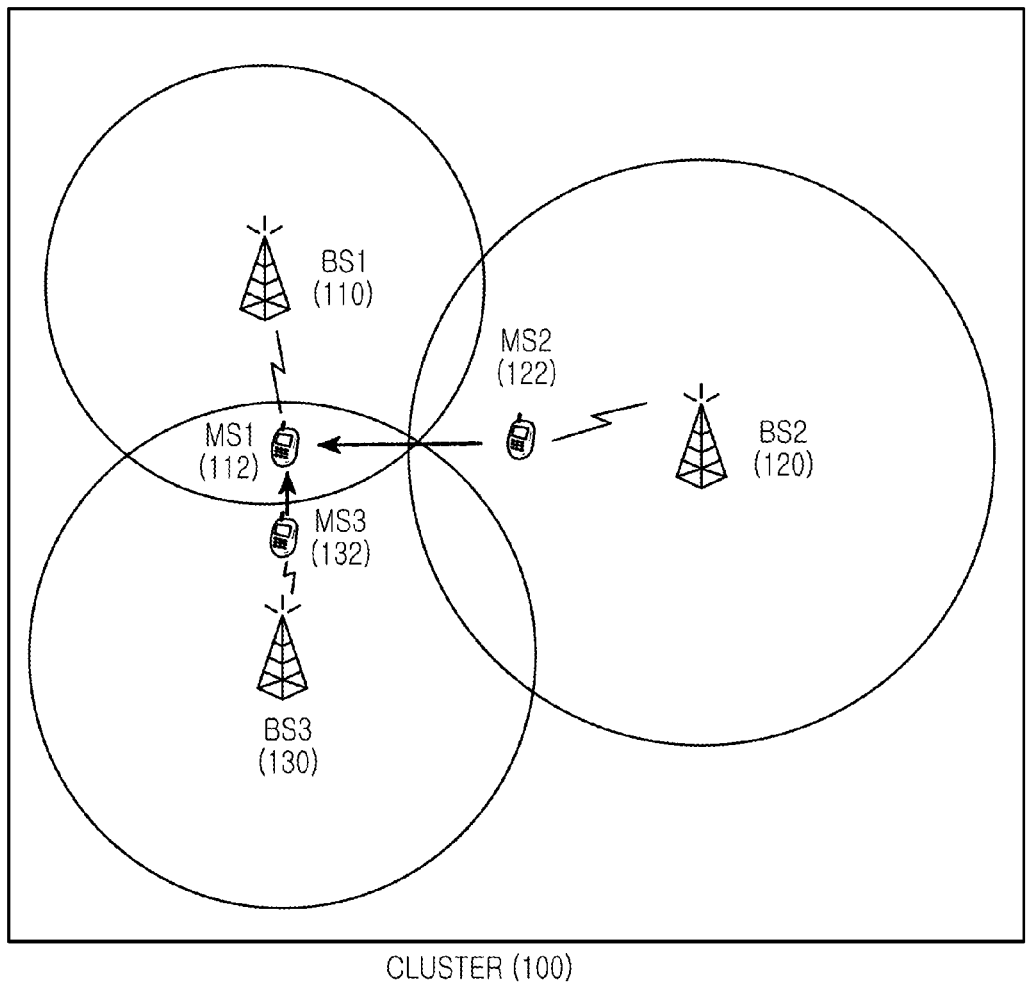
FIG. 1 is a diagram illustrating a construction of a wireless communication system using a Precoding Matrix Index (PMI) coordination scheme according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 9, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Below, exemplary embodiments of the present invention provide a technology for mitigating Inter-Cell Interference (ICI) in a Multiple Input Multiple Output (MIMO) system.

In the following description, it is assumed that a MIMO system uses an Orthogonal Frequency Division Multiplexing (OFDM)/Orthogonal Frequency Division Multiple Access (OFDMA) scheme. However, exemplary embodiments of the present invention are identically applicable to a MIMO system using other communication schemes as well.

The following description is made on the premise of a PMI restriction scheme of restricting the use of a Precoding Matrix Index (PMI) that results in a large amount of interference to a cell boundary Mobile Station (MS), among PMI coordination schemes. However, exemplary embodiments of the present invention are equally applicable to a PMI recommendation scheme of recommending the use of a PMI that results in a small amount of interference to a cell boundary MS.

FIG. 1 illustrates a construction of a wireless communication system using a PMI coordination scheme according to an exemplary embodiment of the present invention.

Referring to FIG. 1, a MIMO system is constructed of one cluster 100 including a plurality of cells. For example, the MIMO system is constructed of one cluster 100 including a cell of a BS1 110, a cell of a BS2 120, and a cell of a BS3 130. At this time, the BS1 110, the BS2 120, and the BS3 130 communicate with each other through a backbone network.

The BS1 110 provides service to an MS1 112 located in the service area of BS1 110, the BS2 120 provides service to an MS2 122 located in the service area of MS2 122, and the BS3 130 provides service to an MS3 132 located in the service area of MS3 132.

Inter-Cell Interference (ICI) can be generated among the BS1 110, the BS2 120, and the BS3 130. For example, in a case where the MS1 112, the MS2 122, and the MS3 132 have the same serving band, a transmit signal from the BS2 120 to the MS2 122 and a transmit signal from the BS3 130 to the MS3 132 act as interference in the MS1 112. That is, the MS1 112 is interfered by PMIs used by the MS2 122 and the MS3 132.

Figure 2:
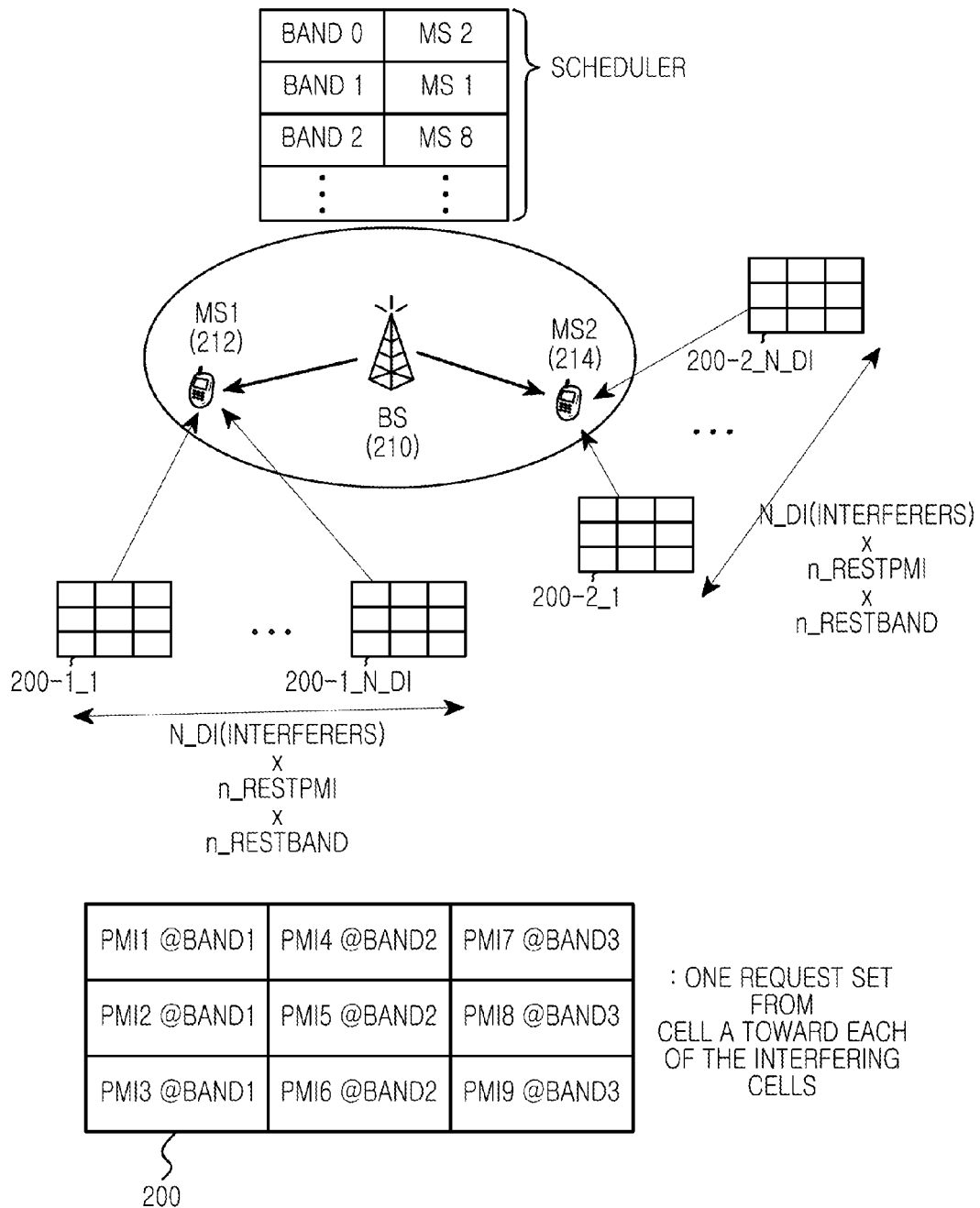
FIG. 2 is a diagram illustrating a method for selecting a PMI in a Multiple Input Multiple Output (MIMO) system according to an exemplary embodiment of the present invention.

Accordingly, in order to reduce the inter-cell interference, the MS1 112 and the BS1 110 determine a band and PMI to make a use restriction request to neighboring BSs, as illustrated in FIG. 2 below.

FIG. 2 illustrates a method for selecting a PMI in a MIMO system according to an exemplary embodiment of the present invention. In the following description, it is assumed that the worst PMI is selected.

Referring to FIG. 2, a BS 210 provides service to an MS1 212 and an MS2 214 located in the service area of BS 210.

In a case where the MS1 212 and MS2 214 are located at a cell boundary, the MS1 212 and MS2 214 determine interference from dominant interfering BSs. For example, the MS1 212 and MS2 214 determine an interference value by subband for each of PMIs available in neighboring BSs, using a channel midamble of a non-precoding form. For another example, the MS1 212 and MS2 214 can also determine one wideband interference value for each of PMIs available in neighboring BSs using a channel midamble of a non-precoding form.

The MS1 212 and the MS2 214 generate request sets (200-1_1 to 200-1_N_D1) and request sets (200-2_1 to 200-2_N_D1) using the determined interference information. And then, the MS1 212 and the MS2 214 transmit the generated request sets (200-1_1 to 200-1_N_D1) and the generated request sets (200-2_1 to 200-2_N_D1) to the BS 210. At this time, the MS1 212 and the MS2 214 generate request sets (200-1_1 to 200-1_N_D1) and the generated request sets (200-2_1 to 200-2_N_D1) by interfering BS and transmit the request sets (200-1_1 to 200-1_N_D1) and the request sets (200-2_1 to 200-2_N_D1) to the BS 210. Request set 200 is an example of one request set. Request set 200 includes at least one PMI index (i.e., index of restPMI) restricting use of at least one PMI included therein, at least one band index (i.e., index of restBand) restricting use of at least one band included therein, an interference cell index (i.e., cell index from which interference is originated), and additional information. The additional information includes interference information determined from the PMI index and band index.

The BS 210 updates the request set by interfering BS provided from the MS1 212 and the MS2 214, using scheduling information of the MS1 212 and MS2 214. For example, the BS 210 removes information on a band other than a serving band of the MS1 212, from the request sets (200-1_1 to 200-1_N_D1) by interfering BS provided from the MS1 212. Also, the BS 210 removes information on a band other than a serving band of the MS2 214, from the request sets (200-2_1 to 200-2_N_D1) by interfering BS provided from the MS2 214.

After that, the BS 210 selects at least one request set among the updated request sets and transmits the selected request set to a corresponding interfering BS. For instance, the BS 210 arbitrarily selects request sets of 'N1' number from the updated request sets. Next, the BS 210 transmits the selected request sets to interfering BSs corresponding to the selected request sets of 'N1' number. If the BS 210 selects all the updated request sets, the BS 210 transmits many request sets to the interfering BSs, and receives many request sets from other BSs. Accordingly, the BS 210 transmits only the selected request sets of 'N1' number to the interfering BSs.

The above determining of the interference by subband includes wideband interference determination that is the most comprehensive interference determination. In the case of using the wideband interference determination scheme, instead of not being constructed with respective subbands, the request set 200 has wideband construction such as 'PMI1@wideband', 'PMI2@wideband' and the like.

The following description is made for a method for feeding interference information back to a serving BS in an MS located at a cell boundary.

Figure 3:
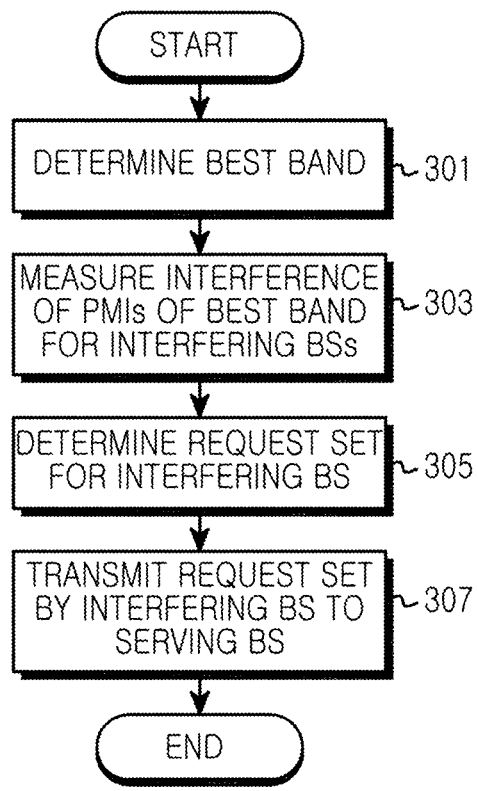
FIG. 3 is a flowchart illustrating a procedure for feeding back interference information in a Mobile Station (MS) of a MIMO system according to an exemplary embodiment of the present invention.

FIG. 3 illustrates a procedure for feeding back interference information in an MS of a MIMO system according to an exemplary embodiment of the present invention.

Referring to FIG. 3, in step 301, the MS determines the best band. Here, the best band refers to a band not included in a use restriction request from a neighboring BS, among at least one or more bands supported by a serving BS.

After that, the MS proceeds to step 303 and determines interference for all PMIs included in the best band with respect to an interfering BS. For example, as in FIG. 2, in a case where a band 1, a band 2, and a band 3 are included in the best band, the MS determines interference of all PMIs of the band 1, band 2, and band 3 by interfering BS.

After determining the interference, the MS proceeds to step 305 and generates a request set for each interfering BS. Here, the request set includes at least one PMI index (i.e., index of restPMI) restricting use of at least one PMI included therein, at least one band index (i.e., index of restBand) restricting use of at least one band included therein, an interference cell index (i.e., cell index from which interference is originated), and additional information. The additional information includes interference information determined in the PMI index and band index.

After generating the request set by interfering BS, the MS proceeds to step 307 and transmits the generated request set by interfering BS to a serving BS.

After that, the MS terminates the procedure according to the exemplary embodiment of the present invention.

In the aforementioned exemplary embodiment, an MS determines interference of a PMI by subband.

In another exemplary embodiment, an MS can also determine wideband interference of a PMI. In this case, the MS finds one or more worst PMIs in the determined wideband interference and then, the MS can construct a request set, such as 'worst PMI @ best band', and feed the request set back to a serving BS. The serving BS makes a wideband restriction request for a PMI to an interfering BS. That is, in a case where the best band or a serving band of an MS quickly varies, the serving band of the MS can change in a process in which the serving BS of the MS makes a PMI restriction request to an interfering BS. In this case, no gain can be obtained from PMI restriction for a specific band. So, it is efficient that the serving BS makes a wideband restriction request to the interfering BS.

In the aforementioned exemplary embodiment, an MS generates a request set to include interference information of all PMIs on the best band.

In another exemplary embodiment, an MS can also select the best PMI by best band, and generate a request set to include interference information of the best PMI by best band.

The following description is made for a method for transmitting a request set provided from an MS, to a neighboring BS in a BS.

Figure 4:
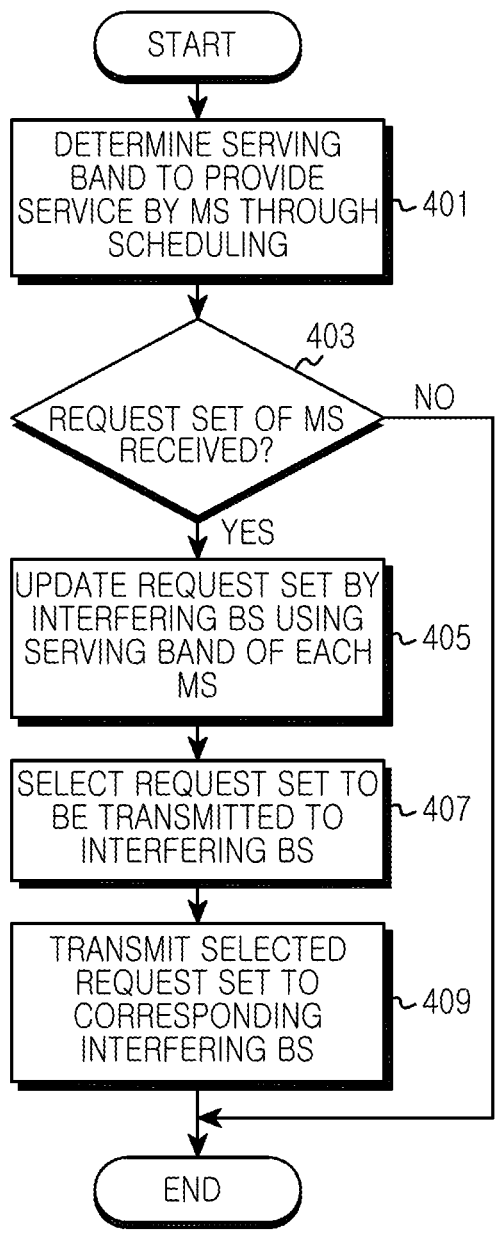
FIG. 4 is a flowchart illustrating a procedure for transmitting a request set to a neighboring Base Station (BS) in a BS of a MIMO system according to an exemplary embodiment of the present invention.

FIG. 4 illustrates a procedure for transmitting a request set to a neighboring BS in a BS of a MIMO system according to an exemplary embodiment of the present invention.

Referring to FIG. 4, in step 401, the BS determines at least one serving band of each of at least one or more MSs to be serviced, through scheduling.

After that, the BS proceeds to step 403 and determines if a request set is received from at least one MS located at a cell boundary.

If the BS does not receive a request set from at least one MS located at a cell boundary, the BS terminates the procedure according to the exemplary embodiment of the present invention.

On the other hand, if the BS receives a request set from at least one MS located at a boundary cell, the BS proceeds to step 405 and updates the request set by interfering BS received from the MS, using the serving band of each MS. That is, the BS removes information on a band other than the serving band of each MS, from the request set of the MS. For example, in FIG. 2, in a case where a serving band of an MS1 212 is a band 2, a BS 210 removes information on a band other than the band 2 from request sets (200-1_1 to 200-1_N_D1) by interfering BS provided from the MS1 212. For another example, in a case where a serving band of the MS2 214 is a band 1, the BS 210 removes information on a band other than the band 1 from request sets (200-2_1 to 200-2_N_D1) by interfering BS provided from the MS2 214.

After updating request sets by interfering BS, the BS proceeds to step 407 and selects request sets for interfering BSs of any number (N1) originating a large amount of interference, from the updated request sets of the respective MSs by interfering BS.

Next, the BS proceeds to step 409 and transmits the selected request sets to the interfering BSs corresponding to the selected request sets, through a backhaul network. That is, the BS makes use restriction requests for bands and PMIs included in the selected request sets, to the interfering BSs corresponding to the selected request sets.

After that, the BS terminates the procedure according to the exemplary embodiment of the present invention.

In the aforementioned exemplary embodiment, the BS selects only request sets of 'N1' number among updated request sets and transmits the selected request sets to interfering BSs.

In another exemplary embodiment, the BS can also transmit updated request sets to interfering BSs. In this case, step 407 of FIG. 4 may be omitted.

In the aforementioned exemplary embodiment, the BS makes a use restriction request for a band and PMI to an interfering BS, using a request set by subband provided from an MS.

In another exemplary embodiment, in a case where an MS feeds a request set determining and constructing wideband interference back to a serving BS, the serving BS can transmit a request set including wideband interference information, to an interfering BS. At this time, the serving BS transmits serving band information of each MS being serviced, to the interfering BS together with the request set.

Figure 5:
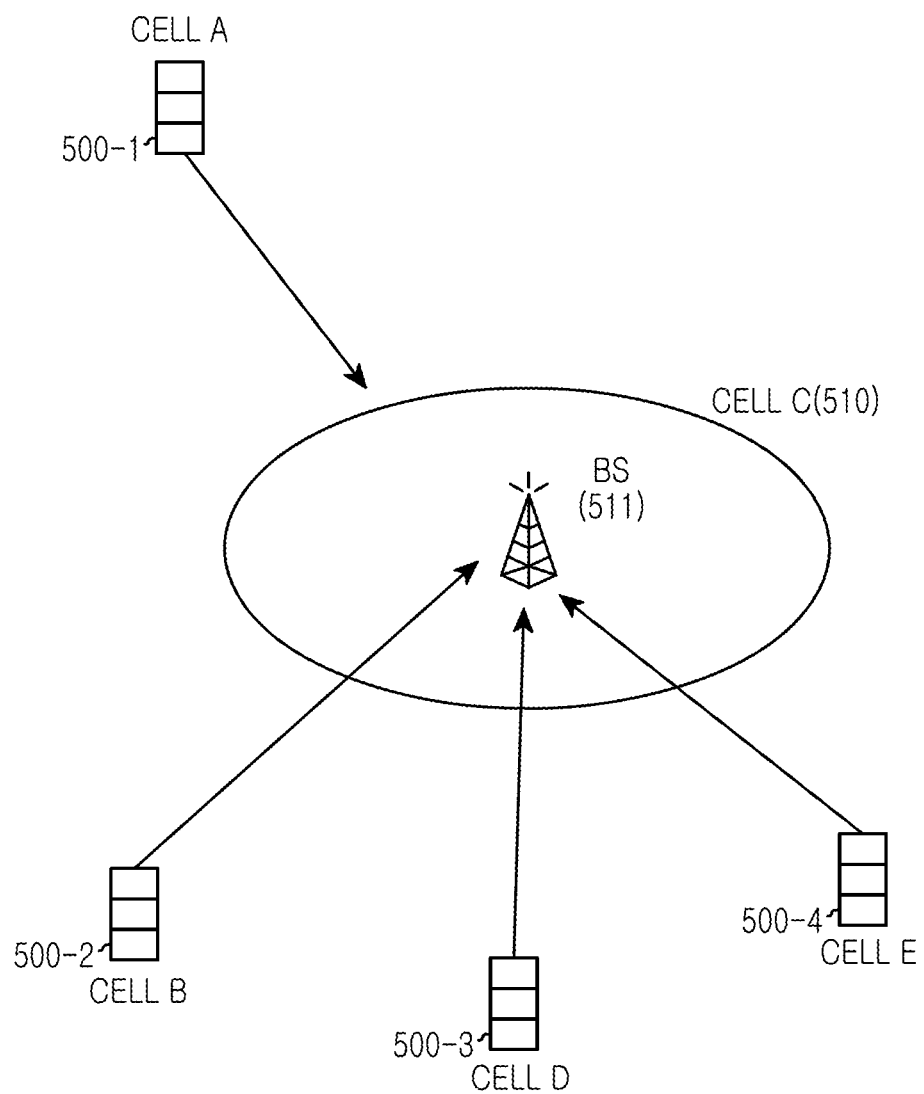
FIG. 5 is a diagram illustrating a procedure for accepting a PMI restriction request in a BS of a MIMO system according to an exemplary embodiment of the present invention.

If a serving BS of an MS located at a cell boundary makes a use restriction request for specific band and PMI to an interfering BS as above, the interfering BS restricts the use of the band and PMI originating interference in a neighboring cell as illustrated in FIG. 5 below.

FIG. 5 illustrates a procedure for accepting a PMI restriction request in a BS of a MIMO system according to an exemplary embodiment of the present invention.

Referring to FIG. 5, a cell C 510 exerts interference on a cell A, a cell B, a cell D, and a cell E in a process in which the cell C 510 transmits a signal to an MS within the service area of cell C 510. In this case, a BS 511 managing the cell C 510 can receive request sets 500-1, 500-2, 500-3, and 500-4 from the cell A, the cell B, the cell D, and the cell E through a backbone network, respectively.

Figure 6:
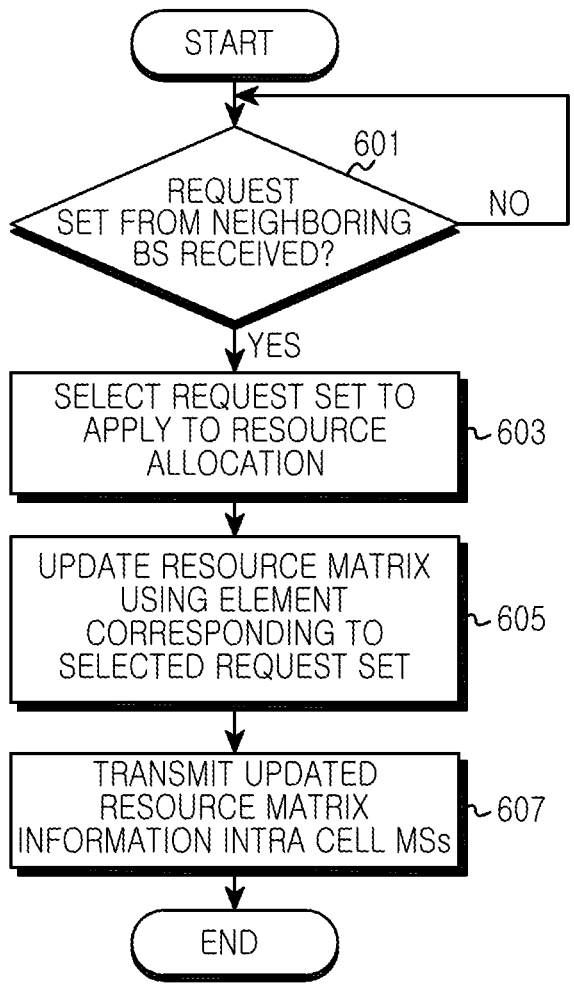
FIG. 6 is a flowchart illustrating a procedure for, after restricting a PMI, sharing the same information with intra cell MSs in a BS of a MIMO system according to an exemplary embodiment of the present invention.

In this case, the BS 511 determines a band and PMI to restrict a use thereof as illustrated in FIG. 6 below, based on the request sets provided from the cell A, the cell B, the cell D, and the cell E.

FIG. 6 illustrates a procedure for, after restricting a PMI, sharing the same information with intra cell MSs in a BS of a MIMO system according to an exemplary embodiment of the present invention.

Referring to FIG. 6, in step 601, the BS determines if a request set making a use restriction request for a band and PMI is received from at least one neighboring BS.

If a request set is not received from at least one neighboring BS, the BS returns to step 601 to determine if a request set making a use restriction request for a band and PMI is received from at least one neighboring BS.

On the other hand, if a request set is received from at least one neighboring BS, the BS proceeds to step 603 and selects a request set to apply to a resource allocation, from the received at least one request set. That is, the BS selects at least one request set to be used for resource matrix construction, from the received at least one request set. For example, in FIG. 5, the BS 511 arbitrarily selects request sets of 'N2' number among request sets provided from a cell A, a cell B, a cell D, and a cell E.

After that, the BS proceeds to step 605 and updates a band-PMI resource matrix using the selected request set. That is, the BS masks out, for non-use, an element corresponding to the request set selected in step 603, in the band-PMI resource matrix. For example, the BS masks out, for non-use, an element corresponding to a request set in a band-PMI resource matrix constructed as illustrated in FIG. 7, which is described further below.

After updating a band-PMI resource matrix, the BS proceeds to step 607 and transmits information on the updated band-PMI resource matrix to at least one MS located within a cell. For example, the BS transmits a broadcasting message that includes the information on the updated band-PMI resource matrix.

After that, the BS terminates the procedure according to the exemplary embodiment of the present invention.

FIG. 7 illustrates a resource matrix construction in a MIMO system according to an exemplary embodiment of the present invention.

Referring to FIG. 7, in a case where an interfering BS receives a request set from at least one neighboring BS, the interfering BS updates a band-PMI resource matrix based on the request set so as to reduce interference exerted on the neighboring BS.

In other words, in order to restrict the use of an element corresponding to the request set received from the neighboring BS, the interfering BS masks out the element. At this time, the interfering BS provides service to at least one MS located in the service area of the interfering BS, using an element not masked out.

The following description is made for a construction of an MS for determining interference from an interfering BS and feeding the determined interference back to a serving BS.

Figure 8:
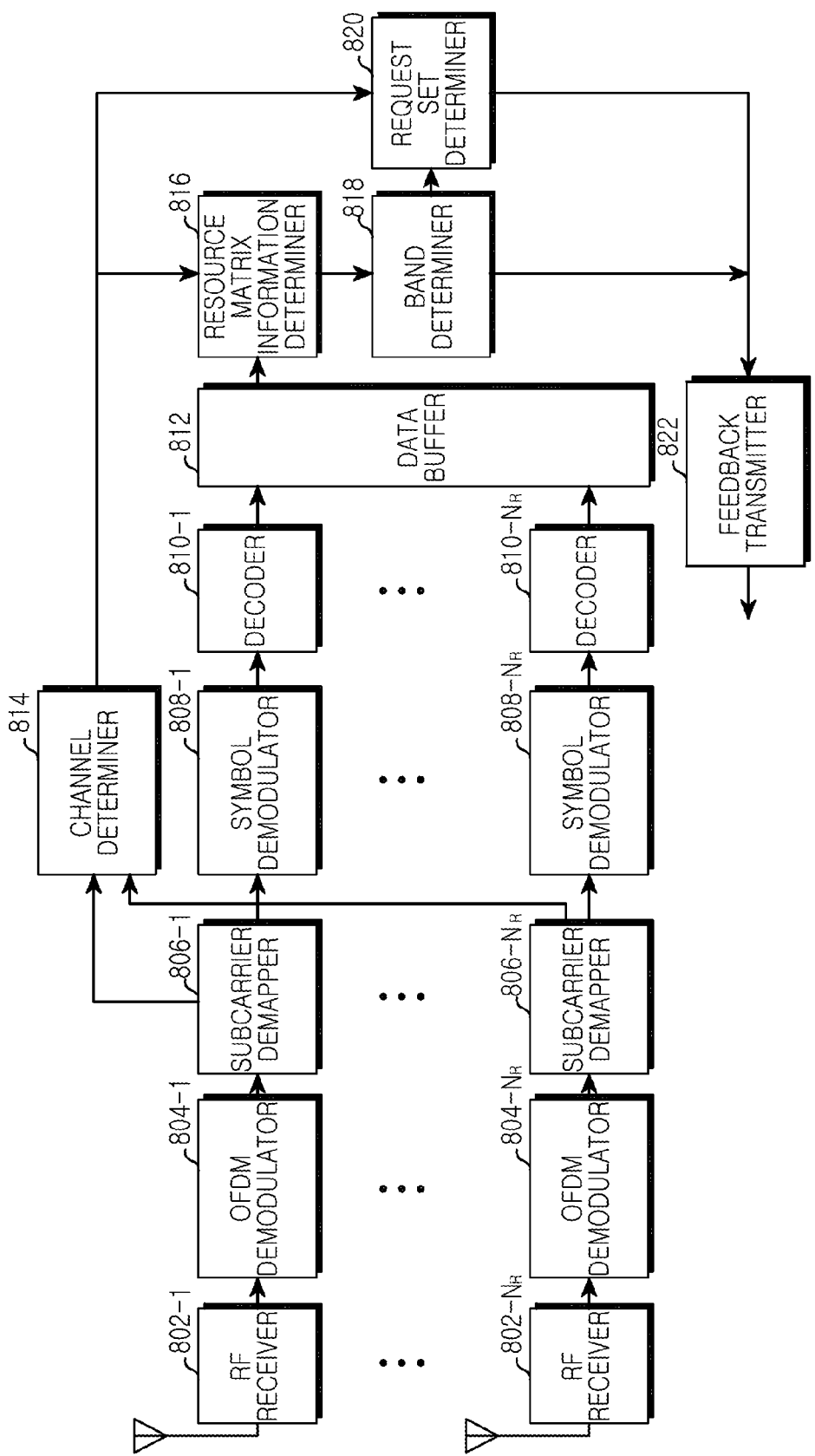
FIG. 8 is a block diagram illustrating a construction of an MS in a MIMO system according to an exemplary embodiment of the present invention.

FIG. 8 illustrates a construction of an MS in a MIMO system according to an exemplary embodiment of the present invention.

Referring to FIG. 8, the MS includes at least two RF receivers 802-1 to 802-$N_R$, at least two OFDM demodulators 804-1 to 804-$N_R$, at least two subcarrier demappers 806-1 to 806-$N_R$, at least two symbol demodulators 808-1 to 808-$N_R$, at least two decoders 810-1 to 810-$N_R$, a data buffer 812, a channel determiner 814, a resource matrix information determiner 816, a band determiner 818, a request set determiner 820, and a feedback transmitter 822.

The RF receivers 802-1 to 802-$N_R$ convert RF band signals received through respective antennas into baseband signals.

The OFDM demodulators 804-1 to 804-$N_R$ distinguish, in an OFDM symbol unit, baseband signals provided from the RF receivers 802-1 to 802-$N_R$ connecting to respective reception paths and remove Cyclic Prefixes (CPs). After that, the OFDM demodulators 804-1 to 804-$N_R$ restore complex symbols mapped to a frequency domain through Fast Fourier Transform (FFT) operation.

The subcarrier demappers 806-1 to 806-$N_R$ extract actual data complex symbols from complex symbols provided from the OFDM demodulators 804-1 to 804-$N_R$ connecting to the respective reception paths, and provide the extracted complex symbols to the respective symbol demodulators 808-1 to 808-$N_R$. Also, the subcarrier demappers 806-1 to 806-$N_R$ extract symbols (e.g., pilot symbols) of predefined positions for channel estimation and provide the extracted symbols to the channel determiner 814.

The symbol demodulators 808-1 to 808-$N_R$ demodulate complex symbols provided from the subcarrier demappers 806-1 to 806-$N_R$ connecting to the respective reception paths, and convert the complex symbols into an encoded bit stream.

The decoders 810-1 to 810-$N_R$ decode an encoded bit stream provided from the symbol demodulators 808-1 to 808-$N_R$ connecting to the respective reception paths.

The data buffer 812 temporarily stores an information bit stream decoded by the decoders 810-1 to 810-$N_R$.

The channel determiner 814 determines a channel state with a serving BS using signals provided from the subcarrier demappers 806-1 to 806-$N_R$. After that, the channel determiner 814 determines a Channel Quality Indicator (CQI) based on the determined channel state.

Also, the channel determiner 814 determines interference power from at least one interfering BS.

The resource matrix information determiner 816 determines band-PMI resource matrix information provided from the serving BS through the data buffer 812. At this time, the resource matrix information determiner 816 determines an element not masked out in the band-PMI resource matrix.

Also, the resource matrix information determiner 816 determines a CQI for the element not masked out, through a CQI determined by the channel determiner 814.

The band determiner 818 selects bands of 'N' number having the largest CQI among elements not masked out in the band-PMI resource matrix. In the following description, the bands of the 'N' number selected in the band determiner 818 are referred to as the 'best bands'.

After determining interference power information by interfering BS, the request set determiner 820 generates a request set. At this time, the request set determiner 820 determines a request set for at least one PMI included in the best band, in consideration of interference power of at least one interfering BS provided from the channel determiner 814.

The feedback transmitter 822 transmits feedback information, which includes request set information by interfering BS provided from the request set determiner 820, to the serving BS.

Although not illustrated, the MS further includes a controller. The controller determines if the MS is located at a cell boundary.

In the aforementioned exemplary embodiment, an MS generates a request set for the worst PMI in consideration of interference power for all PMIs included in the best band. Accordingly, the band determiner 818 of the MS selects bands of 'N' number having the largest CQI among elements not masked out in a band-PMI resource matrix, as a band available between a serving BS and the MS.

In another exemplary embodiment, an MS can also select the best PMI by best band and generate a request set to include interference information on the best PMI by best band. In this case, after selecting bands of 'N' number, the band determiner 818 of the MS selects at least one PMI in the selected bands of the 'N' number.

The following description is made for a construction of a BS for transmitting, to a neighboring BS, a request set provided from an MS and, according to a request set provided from a neighboring BS, restricting the use of a band and PMI.

FIG. 9 illustrates a construction of a BS in a MIMO system according to an exemplary embodiment of the present invention.

Referring to FIG. 9, the BS includes a scheduler 900, a wired interface 902, a request set selector 904, a resource matrix information generator 906, a feedback receiver 908, a band determiner 910, a data buffer 912, a plurality of encoders 914-1 to 914-$N_T$, a plurality of symbol modulators 916-1 to 916-$N_T$, an interference removal precoder 918, a plurality of subcarrier mappers 920-1 to 920-$N_T$, a plurality of OFDM modulators 922-1 to 922-$N_T$, and a plurality of RF transmitters 924-1 to 924-$N_T$.

In a case where the BS operates as a serving BS of MSs located at a cell boundary, the scheduler 900 determines a serving band for at least one MS for providing service, through scheduling.

The feedback receiver 908 receives feedback information from at least one MS. At this time, the feedback receiver 908 provides a request set by interfering BS among the feedback information to the request set selector 904, and provides a CQI to the band determiner 910. Here, the CQI can also include a CQI for each PMI for each band.

The band determiner 910 determines a band and PMI to be used when transmitting a signal to each MS, using a CQI by MS provided from the feedback receiver 908.

The request set selector 904 updates a request set by interfering BS provided from at least one cell boundary MS through the feedback receiver 908, based on a serving band of each cell boundary MS. That is, the request set selector 904 removes, if necessary, information on a band other than a serving band of each MS from a request set for each MS.

After that, the request set selector 904 selects request sets of 'N1' number originating most interference, from the updated request set by interfering BS for each MS.

The wired interface 902 communicates with at least one neighboring BS through a backbone network. For example, the wired interface 902 transmits a request set provided from the request set selector 904, to a neighboring BS corresponding to the request set.

In a case where the BS operates as an interfering BS exerting interference on a neighboring cell, the wired interface 902 communicates with at least one neighboring BS through the backbone network. For example, the wired interface 902 receives a request set from at least one neighboring BS and provides the received request set to the request set selector 904.

The request set selector 904 selects request sets of 'N2' number to apply to resource matrix generation, from a request set provided from at least one neighboring BS through the wired interface 902.

The resource matrix information generator 906 updates a band-PMI resource matrix using request sets of 'N2' number provided from the request set selector 904. For example, the resource matrix information generator 906 masks out, for non-use, elements corresponding to the request sets of 'N2' number provided from the request set selector 904, in a band-PMI resource matrix.

The data buffer 912 temporarily stores data to be transmitted to an MS located in a service area. If a transmission time point arrives, the data buffer 912 outputs the stored data.

The encoders 914-1 to 914-$N_T$ encode a data bit stream provided from the data buffer 912. The symbol modulators 916-1 to 916-$N_T$ modulate encoded bit streams provided from the encoders 914-1 to 914-$N_T$ of respective transmission paths.

The interference removal precoder 918 precodes modulation symbols provided from the respective symbol modulators 916-1 to 916-$N_T$ for mitigating inter-cell interference. That is, the interference removal precoder 918 precodes transmit signals using a precode matrix corresponding to a band and PMI selected by the band determiner 910.

The subcarrier mappers 920-1 to 920-$N_T$ map transmit signals of transmission paths including themselves among precoded transmit signals provided from the interference removal precoder 918 to subcarriers, and construct frequency domain signals.

The OFDM modulators 922-1 to 922-$N_T$ convert frequency domain signals provided from the subcarrier mappers 920-1 to 920-$N_T$ of the respective transmission paths, into time domain signals through Inverse Fast Fourier Transform (IFFT) operation. After that, the OFDM modulators 922-1 to 922-$N_T$ insert CPs into the time domain signals and construct OFDM symbols of a baseband.

The RF transmitters 924-1 to 924-$N_T$ convert OFDM symbols of a baseband provided from the OFDM modulators 922-1 to 922-$N_T$ of the respective transmission paths into signals of RF bands, and transmit the RF band signals through corresponding antennas.

Although not illustrated, the BS further includes a message generator generating a control message. The message generator generates a control message including band-PMI resource matrix information updated in the resource matrix information generator 906. After that, the BS transmits the control message generated in the message generator to a service area together with the data.

As described above, exemplary embodiments of the present invention have an advantage of being capable of reducing overhead caused by feedback of an MS and inter-cell interference, by transmitting only a PMI for a serving band of an MS to a neighboring cell so as to control inter-cell interference in a BS of a MIMO system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Base Station (BS) in a wireless communication system, the method comprising:
    receiving at least one request set for at least one neighboring cell, from at least one Mobile Station (MS);
    updating the at least one request set based at least in part on a serving band of each MS; and
    transmitting the updated at least one request set to the at least one neighboring cell,
    wherein the request set comprises a band and a Precoding Matrix Index (PMI) for making a use restriction or recommendation request to a neighboring cell.

2. The method of claim 1, wherein the request set comprises at least one PMI index of at least one PMI, at least one band index of at least one band, an interference cell index, and interference information measured based at least in part on a PMI index and a band index.

3. The method of claim 1, wherein the updating of the request set comprises removing information on a band that does not correspond to a serving band of a corresponding MS in each request set.

4. The method of claim 1, wherein the transmitting of the updated at least one request set to the neighboring cell further comprises:
    selecting at least one request set to be transmitted to a neighboring cell among the updated at least one request set; and
    transmitting the selected request set to at least one neighboring cell.

5. The method of claim 4, wherein the transmitting of the updated at least one request set to the neighboring cell comprises transmitting the selected request set to a neighboring cell corresponding to a neighboring cell index included in the selected request set.

6. An apparatus of a Base Station (BS) in a wireless communication system, the apparatus comprising:
    a receiver configured to receive at least one request set for at least one neighboring cell, from at least one Mobile Station (MS);
    a request set selector configured to update the at least one request set based at least in part on a serving band of each MS; and
    a transmitter configured to transmit the updated at least one request set to the at least one neighboring cell,
    wherein the request set comprises a band and a Precoding Matrix Index (PMI) for making a use restriction or recommendation request to a neighboring cell.

7. The apparatus of claim 6, wherein the request set comprises at least one PMI index of at least one PMI, at least one band index of at least one band, an interference cell index, and interference information measured based at least in part on a PMI index and a band index.

8. The apparatus of claim 6, wherein the request set selector is further configured to remove information on a band that does not correspond to a serving band of a corresponding MS in each request set, and to update the request set according to such removal.

9. The apparatus of claim 6, wherein the request set selector is further configured to, after updating the request set, select at least one request set to be transmitted to a neighboring cell among the updated at least one request set, and
    wherein the transmitter is further configured to transmit the request set selected in the request set selector to at least one neighboring cell.

10. The apparatus of claim 6, wherein the transmitter is further configured to transmit the selected request set to a neighboring cell corresponding to a neighboring cell index included in the request set, through a backhaul.

11. A method for operating a Base Station (BS) in a wireless communication system, the method comprising:
    receiving at least one request set for each of at least one neighboring cell, from at least one Mobile Station (MS); and
    transmitting serving band information of each MS and at least one request set to the at least one neighboring cell,
    wherein the request set comprises Precoding Matrix Index (PMI) information for making a use restriction or recommendation request to a neighboring cell.

12. The method of claim 11, wherein the request set comprises at least one PMI index of at least one PMI, an interference cell index, and interference information measured based at least in part on a PMI index.

13. The method of claim 11, wherein the transmitting of the request set comprises:
    selecting at least one request set to be transmitted to a neighboring cell among the at least one request set; and
    transmitting serving band information of each MS and the selected request set to the at least one neighboring cell.

14. An apparatus of a Base Station (BS) in a wireless communication system, the apparatus comprising:
    a receiver configured to receive at least one request set for each of at least one neighboring cell, from at least one Mobile Station (MS); and
    a transmitter configured to transmit serving band information of each MS and at least one request set to the at least one neighboring cell,
    wherein the request set comprises Precoding Matrix Index (PMI) information for making a use restriction or recommendation request to a neighboring cell.

15. The apparatus of claim 14, wherein the request set comprises at least one PMI index of at least one PMI, an interference cell index, and interference information measured based at least in part on a PMI index.

16. The apparatus of claim 14, further comprising:
    a request set selector configured to select at least one request set to be transmitted to a neighboring cell among the at least one request set,
    wherein the transmitter is further configured to transmit serving band information of each MS and the request set selected in the request set selector, to the at least one neighboring cell.

17. A method for operating a Mobile Station (MS) in a wireless communication system, the method comprising:
    determining at least one band not included in a use restriction request from a neighboring cell;
    determining interference of at least one Precoding Matrix Index (PMI) comprised in each of the at least one band;
    determining a band and a PMI to make a use restriction or recommendation request to a neighboring cell in consideration of the interference of the at least one PMI; and feeding the band and the PMI to make the use restriction or recommendation request to the neighboring cell, back to a serving BS.

18. The method of claim 17, wherein the feeding back to the serving BS comprises:
generating a request set that comprises at least one of at least one PMI index of at least one PMI included therein, at least one band index of at least one band included therein, an interference cell index, and interference information measured based at least in part on a PMI index and a band index; and
feeding the request set back to the serving BS.

19. An apparatus of a Mobile Station (MS) in a wireless communication system, the apparatus comprising:
a resource determiner configured to determine at least one band not included in a use restriction request from a neighboring cell;
a channel determiner configured to determine interference of at least one Precoding Matrix Index (PMI) comprised in each of the at least one band;
a request set determiner configured to determine a band and a PMI to make a use restriction or recommendation request to a neighboring cell in consideration of the interference of the at least one PMI; and
a feedback transmitter configured to feed the band and the PMI to make the use restriction or recommendation request to the neighboring cell, back to a serving BS.

20. The apparatus of claim 19, wherein the request set determiner is further configured to generate a request set that comprises at least one PMI index of at least one PMI, at least one band index of at least one band, an interference cell index, and interference information measured based at least in part on a PMI index and a band index, and
wherein the transmitter is further configured to feed the request set generated in the request set determiner back to the serving BS.

21. A method of a Base Station (BS) in a wireless communication system, the method comprising:
selecting at least one request set among at least one request set received from at least one neighboring cell;
updating a resource information based at least in part on the selected request set; and
transmitting the updated resource information to at least one MS,
wherein the request set comprises band and PMI information included in a use restriction or recommendation request from a neighboring cell.

22. The method of claim 21, wherein the band included in the use restriction request from the neighboring cell included in the request set comprises a serving band of an MS receiving interference from the BS.

23. The method of claim 21, wherein the updating of the resource information comprises setting, for non-use, a band and PMI comprised in the selected request set, in the resource information representing a resource used by the BS.

24. An apparatus of a Base Station (BS) in a wireless communication system, the apparatus comprising:
a receiver configured to receive at least one request set from at least one neighboring cell;
a request set selector configured to select at least one request set among the at least one request set received;
a resource information generator configured to update a resource information based at least in part on the selected request set; and
a transmitter configured to transmit the updated resource information to at least one MS,
wherein the request set comprises band and PMI information included in a use restriction or recommendation request from a neighboring cell.

25. The apparatus of claim 24, wherein the band included in the use restriction request from the neighboring cell included in the request set comprises a serving band of an MS receiving interference from the BS.

26. The apparatus of claim 24, wherein the resource information generator is configured to set, for non-use, a band and PMI comprised in the selected request set, in the resource information representing a resource used by the BS.

* * * * *